United States Patent [19]

Dünwald et al.

[11] Patent Number: 5,126,479
[45] Date of Patent: Jun. 30, 1992

[54] PROCESS FOR THE PRODUCTION OF BLOCKED POLYISOCYANATES CONTAINING CARBODIIMIDE GROUPS, THE POLYISOCYANATES OBTAINABLE BY THIS PROCESS AND THEIR USE FOR THE PRODUCTION OF PLASTICS

[75] Inventors: Willi Dünwald, Leverkusen; Reinhard Halpaap; Josef Pedain, both of Cologne, all of Fed. Rep. of Germany

[73] Assignee: Bayer Aktiengesellschaft, Leverkusen, Fed. Rep. of Germany

[21] Appl. No.: 351,683

[22] Filed: May 15, 1989

Related U.S. Application Data

[63] Continuation of Ser. No. 1,119, Jan. 7, 1987, abandoned.

[30] Foreign Application Priority Data

Jan. 14, 1986 [DE] Fed. Rep. of Germany ....... 3600766

[51] Int. Cl.⁵ .............................. C07C 251/00
[52] U.S. Cl. .................................... 560/334
[58] Field of Search ......................... 560/334

[56] References Cited

U.S. PATENT DOCUMENTS 4,077,989 3/1978 Schafer et al. .

FOREIGN PATENT DOCUMENTS 1546922 8/1970 Fed. Rep. of Germany .

Primary Examiner—Alan Siegel
Attorney, Agent, or Firm—Joseph C. Gil; Thomas W. Roy

[57] ABSTRACT

The present invention relates to a process for the production of organic compounds containing (i) carbodiimide and/or uretone imine groups and (ii) blocked isocyanate groups, wherein about 10 to 90% of the isocyanate groups of an organic polyisocyanate are blocked by reaction with a monofunctional blocking agent for isocyanate groups, and subsequently about 65 to 100% of the free isocyanate groups still remaining are converted into carbodiimide groups with elimination of the carbodiimide. The present invention also relates to the organic compounds obtainable by this process and to their use for the production of plastics by reaction with compounds containing isocyanate-reactive groups by the isocyanate polyaddition process.

1 Claim, No Drawings

PROCESS FOR THE PRODUCTION OF BLOCKED POLYISOCYANATES CONTAINING CARBODIIMIDE GROUPS, THE POLYISOCYANATES OBTAINABLE BY THIS PROCESS AND THEIR USE FOR THE PRODUCTION OF PLASTICS

This application is a continuation of U.S. application Ser. No. 07/001,119 filed Jan. 7, 1987 now abandoned.

BACKGROUND OF THE INVENTION

1. Field of the Invention

This invention relates to a new process for the production of blocked polyisocyanates containing carbodiimide groups by the at least partial carbodiimidization of the free isocyanate groups in partially blocked organic polyisocyanates, to the compounds obtainable by this process and to their use as synthesis component in the production of polyurethane plastics.

2. Description of the Prior Art

Blocked isocyanates and their use as the isocyanate component, i.e. as crosslinking agent, for stoving lacquers have been known for some time (cf. for example Houben-Weyl, Methoden der Organischen Chemie, Vol. XIV/2, pages 61-70). The blocked isocyanates may be used in the production of stoving lacquers which are stable in storage both at room temperature and at mildly elevated temperatures and which only crosslink at elevated temperatures such as those in stoving ovens.

In addition, it is known that in the presence of suitable catalysts, for example phosphorus-containing catalysts, organic isocyanates form carbodiimide structures with elimination of carbon dioxide (cf. for example U.S. Pat. No. 2,941,966). In general, the diisocyanates containing carbodiimide groups thus obtained are only slightly soluble in organic solvents, as can be seen for example from DE-OS 2,436,741.

It has now surprisingly been found that polyisocyanates containing carbodiimide groups which are readily soluble in organic solvents can be obtained if the isocyanate groups of the starting polyisocyanates are partially blocked before the carbodiimidization. This solubility is surprisingly evident even in the case of solvents containing phenolic hydroxyl groups such as phenol, cresol or xylenol, although phenols of this type are known not to be inert to carbodiimide groups.

It has also been found that the products obtained by the process according to the invention containing both carbodiimide and also blocked isocyanate groups, as described in detail hereinafter, are particularly suitable polyisocyanates for stoving lacquers, particularly for wire lacquering, based on organic polyisocyanates containing blocked isocyanate groups and organic compounds containing isocyanate-reactive groups. On the one hand, the products obtained by the process according to the invention are suitable as wire lacquers which may be lacquered at particularly high speeds. On the other hand, it is possible using the products obtained by the process according to the invention to produce both tinnable and non-tinnable i.e. non-scorching, wire lacquer coatings. The difference depends upon the type of reactant used for the blocked polyisocyanates according to the invention and whether a catalyst is present since these factors affect whether just the blocked isocyanate groups or both the blocked isocyanate groups and carbodiimide groups take part in the crosslinking reaction. When reactants containing carboxyl groups are used and the reaction is carried out in the presence of a suitable metal-containing catalyst, it is possible for the carbodiimide groups to undergo crosslinking; whereas, when reactants predominantly containing hydroxyl groups are used and no catalyst is present, the reaction between hydroxyl groups and blocked isocyanate groups takes place. Non-scorching wire lacquer coatings ar obtained in the first case and tinnable wire lacquer coatings in the second case. Where uretone imine groups (formed through addition of isocyanate groups onto carbodiimide groups) are present, the isocyanate groups present therein react like blocked isocyanate groups, while the corresponding carbodiimide groups correspond in their reaction behavior to the free carbodiimide groups.

SUMMARY OF THE INVENTION

The present invention relates to a process for the production of organic compounds containing (i) carbodiimide and/or uretone imine groups and (ii) blocked isocyanate groups, wherein about 10 to 90% of the isocyanate groups of an organic polyisocyanate are blocked by reaction with a monofunctional blocking agent for isocyanate groups, and subsequently about 65 to 100% of the free isocyanate groups still remaining are converted into carbodiimide groups with elimination of carbon dioxide.

The invention also relates to the organic compounds obtainable by this process containing
(i) carbodiimide and/or uretone imine groups and
(ii) blocked isocyanate groups.

Finally, the invention also relates to the use of the compounds containing (i) carbodiimide and/or uretone imine groups and (ii) blocked isocyanate groups in combination with organic compounds containing isocyanate-reactive groups for the production of plastics by the isocyanate polyaddition process.

DETAILED DESCRIPTION OF THE INVENTION

Suitable polyisocyanates for the process according to the invention are any organic compounds containing at least two isocyanate groups such as polyisocyanates corresponding to the following general formula

wherein
Q represents an aromatic hydrocarbon radical having 6 to 15 carbon atoms and optionally containing methyl substituents or methylene bridges; an araliphatic hydrocarbon radical having 4 to 18, preferably 6 to 10 carbon atoms; a cycloaliphatic hydrocarbon radical having 6 to 15 carbon atoms; or an araliphatic hydrocarbon radical having 7 to 14 carbon atoms; and
b is an integer of from 2 to 3, preferably 2.

Typical examples of these polyisocyanates which are suitable for use in accordance with the invention include tetramethylene diisocyanate, hexamethylene diisocyanate, 1,12-dodecane diisocyanate, 1,18-octadecane diisocyanate, cyclohexane-1,3- and -1,4-diisocyanate and mixtures of these isomers, 1-isocyanato-3,3,5-trimethyl-5-isocyanatomethylcyclohexane (IPDI), perhydro-2,4'- and/or -4,4'-diphenylmethane diisocyanate, 1,3- and 1,4-phenylene diisocyanate, 2,4- and 2,6-tolylene diisocyanate and mixtures of these isomers, diphenylmethane-2,4' and/or 4,4'-diisocyanate, 3,2'- and/or 3,4'-diisocyanato-4-methyl-diphenylmethane, naphthylene-1,5-diisocyanate or triphenyl-methane-4,4',4''-triisocyanate.

It is also possible to use modified polyisocyanates, such as polyisocyanates containing biuret, allophanate, isocyanurate or urethane structures.

Other suitable polyisocyanates include polyphenyl-polymethylene polyisocyanates of the type obtained by the phosgenation of aniline-formaldehyde condensates and described, for example, in GB-PS 874,430 and 848,671; polyisocyanates containing isocyanurate groups of the type described, for example, in U.S. Pat. No. 4,288,586, DE-PS Nos. 1,022,789, 1,222,067 and 1,027,394, DE-OS Nos. 1,929,034, 2,004,048 and 2,839,133 and EP-OS 10,589; polyisocyanates containing acylated urea groups according to DE-PS 1,230,778; and polyisocyanates containing biuret groups of the type described, for example, in DE-PS 1,101,394, GB-PS 889,050 and FR-PS 7,017,514.

Another suitable group of polyisocyanates which may be used in the process according to the invention are reaction products (NCO-prepolymers) containing isocyanate and urethane groups of the type obtained in known manner by the reaction of the above-mentioned polyisocyanates corresponding to the formula Q(NCO)

with substoichiometric quantities of polyhydroxyl compounds, particularly di- or trihydroxyalkanes optionally containing ether groups and having a molecular weight below 400 and/or the polyhydroxy-polyesters and polyethers known from polyurethane chemistry and having a molecular weight of 400 to about 10,000, preferably 400 to about 6000 and most preferably 400 to about 4000.

It is of course also possible to use mixtures of the polyisocyanates previously mentioned by way of example and to also use those described for example by W. Siefken in Justus Liebig's Annalen der Chemie, 562, pages 75-136 (1949), for the process according to the invention.

Particularly preferred starting polyisocyanates are those having a molecular weight of 174 to 1000 and containing only aromatically bound isocyanate groups, especially the industrially readily available aromatic polyisocyanates such as 2,4-diisocyanatotoluene, mixtures thereof with 2,6-diisocyanatotoluene, 4,4'-diisocyanatodiphenylmethane, mixtures thereof with 2,4'- and, optionally, 2,2'-diisocyanatodiphenylmethane and mixtures of these isomers with their higher homologs obtained by the phosgenation of aniline-formaldehyde condensates. Mixtures of polyisocyanates such as these may of course also be used. It is particularly preferred to use the last-mentioned aromatic diisocyanates and mixtures thereof.

Suitable blocking agents are the known monofunctional blocking agents. Examples include phenols having a molecular weight of 94 to 318 such as phenol, the isomeric cresols, the isomeric xylenols and mixtures thereof; monohydric alcohols having a molecular weight of 32 to about 250 such as methanol, ethanol, n-propanol, n-octanol, benzylalcohol, 2-phenylethanol, cyclopentanol, cyclohexanol, 2-methoxyethanol, 2-ethoxyethanol, diethylene glycol monomethylether and diethylene glycol monoethylether; aliphatic, cycloaliphatic or araliphatic monooximes having a molecular weight of 73 to about 325 and preferably 73 to 141, such as acetone oxime, 3-methylbutanone oxime, 3,3-dimethylbutanone oxime, 2- and 3-pentanone oxime, 4-methyl-2-pentanone oxime, cyclopentanone oxime, 2,2,4(2,4,4)-trimethylcyclopentanone oxime, cyclohexanone oxime, acetophenone oxime and particularly butanone oxime; lactams such as pyrrolidone and, in particular, ε-caprolactam; and CH-active blocking agents such as malonic acid diethylester or acetoacetic acid ethylester. Mixtures of the blocking agents mentioned by way of example may also be used. It is particularly preferred to use the phenolic blocking agents mentioned, especially the isomeric cresols and xylenols and/or diethylene glycol monoethylether or monomethylether as blocking agents.

The first step of the process according to the invention comprises blocking about 10 to 90%, preferably about 20 to 80% and more preferably about 30 to 70% of the isocyanate groups of the starting polyisocyanate in known manner with blocking agents of the type previously mentioned. The partial blocking of the starting polyisocyanates is generally carried out in such a way that, on a statistical average, the partially blocked polyisocyanates have an NCO-functionality of about 0.2 to 1.8, preferably about 0.4 to 1.6 and more preferably about 0.6 to 1.4.

The first step of the process according to the invention is generally carried out at a temperature of about 0° to 250° C., and preferably about 20° to 180° C. The reactants may be combined for example at room temperature, followed by an exothermic reaction, optionally with heating to temperatures of up to about 250° C., preferably up to about 180° C. and, more preferably, about 60° to 150° C. The reaction is complete when no more heat is given off; alternatively, the end of the reaction may be detected by titration of the residual NCO-content. The blocking reaction may be carried out either in the absence of solvents or in the presence of inert solvents. However, the blocking reaction is preferably carried out in the absence of solvents.

In the second reaction step, the partially blocked polyisocyanates are subjected to a carbodiimidization reaction generally at temperatures of about from 0° to 200° C., preferably at temperatures of about 20° to 120° C., in the presence of suitable catalysts.

Suitable carbodiimidization catalysts include organic phosphorus compounds such as phosphine oxides, phospholines, phospholine oxides, phospholine sulfides, phospholidine oxides; and organometallic compounds such as phenyl lithium and diethyl zinc. It is particularly preferred to use a mixture of 1-methyl-1-phospha-2- and 1-methyl-1-phospha-3-cyclopentene-1-oxide.

The dimerization catalysts are generally used in quantities of about 0.01 to 2.5% by weight, preferably about 0.05 to 0.5% by weight, based on the partially blocked polyisocyanate.

If desired, the carbodiimidization reaction may also be carried out in the presence of suitable, preferably inert, solvents. Suitable solvents which may be used both in the first reaction step and also in the second reaction step of the process according to the invention include (halogenated) hydrocarbons, ketones, esters, lactones, ethers, sulfoxides, sulfones and amides. Examples include dichloromethane, tetrachloromethane, tetrachloroethane, trichloroethylene, xylenes, o-dichlorobenzene, benzoic acid alkylester, phthalic acid dimethylester, γ-butyrolactone, ε-caprolactone, acetophenone, cyclohexanone, glycol monomethylether acetate, glycol monoethylether acetate, 1-methoxypropyl-2-acetate, diethylene glycol dimethylether, dimethylformamide, N-methylpyrrolidone, dimethylsulfoxide, tetramethylene sulfone, methylcaprolactam and mixtures thereof. The second reaction step may even be carried out in the presence of solvents which are not totally inert to isocyanate groups, but do not show a marked tendency to form addition compounds because the carbodiimidization reaction generally takes place more quickly under the reaction conditions mentioned than the addition of the free isocyanate groups onto solvents such as these. Solvents of this type include diethylene glycol monomethylether, diethylene glycol monoethylether or ε-caprolactam. In general, however, solvents such as these are not used as the reaction medium for the carbodiimidization reaction.

In general, the carbodiimidization is carried out in such a way that virtually all of the NCO-groups present are reacted and products containing blocked isocyanate and carbodiimide groups are obtained which have a free NCO-content of less than about 1% by weight. However, it may also be of advantage to stop the carbodiimidization before all of the unblocked isocyanate groups have reacted, for example at a degree of carbodiimidization of at least about 65% (degree of carbodiimidization = percentage of the free isocyanate groups of the partially blocked polyisocyanate which has been carbodiimidized). This means that the carbodiimidization reaction is generally carried out in such a way that about 65 to 100% of the free isocyanate groups of the partially blocked polyisocyanate are carbodiimidized. The carbodiimidization reaction may be stopped by means of known catalyst poisons such as those mentioned by way of example in DE-OS 2,537,685. Acid halides such as thionylchloride, sulfurylchloride, phosphorusoxychloride, phosphorus trichloride, acetylchloride and benzoylchloride; and acids such as hydrogen chloride or perfluorobutane sulfonic acid, are suitable as catalyst poisons for the phospholine oxides particularly preferred as carbodiimidization catalysts. The catalyst poisons are generally used in a quantity which is at least equivalent to the quantity of carbodiimidization catalyst used. The particular degree of carbodiimidization may be followed very easily by measurement of the quantity of carbon dioxide given off during the carbodiimidization reaction or by titrimetric determination of the content of free isocyanate groups in the reaction mixture.

If the carbodiimidization reaction is stopped prematurely, the free isocyanate groups still remaining are added onto the carbodiimide groups with formation of uretone imine groups during cooling of the reaction mixture. Accordingly, the products obtained by the process according to the invention contain (i) carbodiimide and/or uretone imine groups and (ii) blocked isocyanate groups. The content of carbodiimide groups (expressed as —N=C=N—) in the products obtained by the process according to the invention is generally 0 to about 25% by weight, preferably about 1 to 20% by weight, while the content of uretone imine groups (expressed as structural units having the empirical molecular formula $C_2N_3O$) is generally 0 to about 30% by weight, preferably 0 to about 25% by weight, the sum of carbodiimide and uretone imine groups (formally expressed as —N=C=N—) generally being about 0.5 to 25% by weight, preferably about 1 to 20% by weight. The content of blocked isocyanate groups (expressed as NCO) is generally about 1 to 25% by weight, preferably about 5 to 22% by weight.

The products obtained by the process according to the invention are valuable starting materials for the production of plastics by the isocyanate polyaddition process. In the context of the invention, the expression "isocyanate polyaddition process" includes both polyaddition reactions such as the reaction between isocyanate and hydroxyl groups, and also condensation reactions such as the reaction between isocyanate and carboxyl groups with amide formation and elimination of carbon dioxide.

Accordingly, preferred reactants for the products obtained by the process according to the invention include organic compounds containing at least two isocyanate-reactive groups of the type known per se from polyurethane chemistry, "isocyanate-reactive groups" being understood to be alcoholic hydroxyl groups and/or carboxyl groups.

The following are examples of reactants for the products obtained by the process according to the invention:

1) Low molecular weight polyhydric alcohols having a molecular weight below 400 and a hydroxyl functionality of 2 to 4 such as ethylene glycol, 1,2- and 1,3-propylene glycol, 1,4-, 1,3- or 2,3-butane diol, 1,6-hexane diol, neopentyl glycol, 1,4-bis-(hydroxymethyl)-cyclohexane, glycerol, trimethylol propane, 1,2,6-hexane triol, diethylene glycol, triethylene glycol, tetraethylene glycol, dipropylene glycol, pentaerythritol, N,N',N"-tris-(2-hydroxyethyl)-isocyanurate, 2,2-bis-[4-(2-hydroxyethoxy)-phenyl]-propane, 2,2-bis-[4-(2-hydroxy-propoxy)-phenyl]-propane, adipic-acid-bis-ethylene glycol ester or maleic-acid-bis-ethylene glycolester.

2) Polyhydroxyl polyesters having a molecular weight of 400 to about 4000, obtained by the reaction of polybasic carboxylic acids such as for adipic acid, phthalic acid, tetrahydrophthalic acid, hexahydrophthalic acid or their anhydrides with excess quantities of polyhydric alcohols of the type mentioned by way of example in 1).

3) Oligourethanes containing aliphatically bound hydroxyl groups and having a molecular weight of about 200 to 2000, obtained by the reaction of the alkane diols or triols optionally containing ether groups mentioned in 1) with substoichiometric quantities of diisocyanates of the type also suitable as starting materials according to this invention and described, for example, in DE-PS 1,644,794 or in GB-PS 1,195,886.

4) Aliphatic, cycloaliphatic or aromatic polycarboxylic acids, preferably dicarboxylic acids, having a molecular weight below 400 such as succinic acid, adipic acid, sebacic acid, phthalic acid, terephthalic acid, isophthalic acid, tetrahydrophthalic acid, hexahydrophthalic acid, maleic acid or fumaric acid.

5) Low molecular weight polyfunctional compounds containing both carboxyl and hydroxyl groups, such as for example 2,2-bis-hydroxymethylpropionic acid or tartaric acid.

6) Polyesters containing free carboxyl groups and, optionally, hydroxyl groups and having a molecular weight of about 400 to 2000, which may be obtained by incomplete esterification of polybasic carboxylic acids of the type mentioned by way of example in 2) and 4) with low molecular weight polyhydroxyl compounds of the type mentioned in 1). The polyhydroxyl compounds may be used both in excess and in subequivalent quantities and also in equivalent quantities, based on the polycarboxylic acids.

Difunctional and trifunctional starting materials are preferably used in the production of the relatively high molecular weight compounds containing isocyanate-reactive groups mentioned by way of example in 2), 3) and 6), so that polyfunctional compounds of the type mentioned by way of example are obtained. The molecular weights specified may be calculated in known manner from the hydroxyl or carboxyl functionality and from the content of hydroxyl and carboxyl groups.

Mixtures of the compounds containing isocyanate-reactive groups mentioned by way of example may of course also be used in the application according to the invention. The reactants mentioned in 2), 3) and 6) are particularly preferred for the products obtained by the process according to the invention. In addition to the reactants mentioned by way of example in 1) to 6), it is also possible to use other compounds reactive to isocyanate and/or carbodiimide groups although this is generally not preferred. Compounds of the type in question include compounds containing amino groups such as hexamethylene diamine and melamine; melamineformaldehyde resins; epoxides containing hydroxyl groups; imido esters; imido esteramides; hydantoins; or polyacrylate resins containing hydroxyl and/or carboxyl groups.

The use according to the invention is directed in particular to the production of lacquer coatings on heat-resistant substrates particularly metals or even glass cloths. The use preferably comprises the production of wire lacquer coatings wherein the lacquer coating is essentially the "plastic."

In order to ensure a certain elasticity of the coatings obtained in the use according to the invention, a certain proportion of relatively high molecular weight linear segments has to be incorporated in the "plastics." This may be done, for example, by using the isocyanate prepolymers based on difunctional synthesis components described by way of example in the foregoing. When products such as these are used, predominantly low molecular weight reactants of the type mentioned may be used for the application according to the invention.

In a preferred embodiment, however, elastic, relatively high molecular weight linear segments may be incorporated via the reactants containing isocyanate-reactive groups used in the application according to the invention.

The products obtained by the process according to the invention and the compounds containing isocyanate-reactive groups are generally used in amounts such that the ratio of the equivalents A of the products obtained by the process according to the invention to the equivalents B of the isocyanate- and/or carbodiimide-reactive groups is about 0.1:1 to 20:1, preferably about 0.5:1 to 4:1 and more preferably about 0.8:1 to 2.5:1. The equivalents A are made up of the sum of the equivalents of blocked isocyanate groups, carbodiimide groups and uretone imine groups; the blocked isocyanate groups and carbodiimide groups are considered as monofunctional groups and the uretone imine groups as difunctional groups. The equivalents B are made up of the sum of isocyanate- and carbodiimide-reactive groups.

The use of the products containing uretone imine groups obtained by the process according to the invention is particularly recommended for the production of tinnable wire lacquer coatings, in which case polyhydroxyl compounds are particularly suitable as reactants for the products obtained by the process according to the invention. Uretone imine-containing and also uretone imine-free products obtained by the process according to the invention may be used for the production of non-tinnable, i.e. non-scorching, wire lacquer coatings, in which case compounds containing carboxyl groups (and optionally hydroxyl groups) of the type mentioned by way of example are preferably used as reactants. However, the high crosslinking density desired here is assured by the presence of suitable metal catalysts which accelerate the addition of carboxyl groups and, optionally, hydroxyl groups onto carbodiimide groups. The crosslinking density may also be influenced by the stoving temperature and also by the stoving time.

In addition, the properties of the "plastics" obtained, in particular the wire lacquer coatings obtained in accordance with the invention may be influenced by the equivalent ratio used. An excess of equivalents A over the equivalents of isocyanate-reactive groups (equivalents B) generally leads to an increase in the hardness of the plastics while, conversely, an increase in the equivalents B over the equivalents A leads to an increase in the flexibility of the plastics.

In accordance with the invention the auxiliaries and additives normally used in polyurethane technology, in particular in polyurethane lacquer technology, may also be incorporated. Auxiliaries include solvents, catalysts for the isocyanate polyaddition reaction, pigments and fillers.

Suitable solvents are the lacquer solvents mentioned by way of example in the foregoing, including in addition 2-butanone, 4-methyl-2-pentanone, butylacetate and cyclohexanol, and also solvents of the type used in particular for the production and application of wire lacquers such as phenol, cresols and xylenols. Mixtures of solvents such as these may also be used. Wire lacquering is preferably carried out using about 15 to 75% by weight, more preferably about 20 to 60% by weight, solutions of the binder components used in the application according to the invention.

The temperatures applied in the hardening of the reaction mixtures according to the invention, and particularly the temperatures prevailing in the stoving ovens normally used for wire lacquers, are generally high enough to enable the addition reaction between isocyanate groups and hydroxyl and/or carboxyl groups to take place quickly. However, these reactions may also be accelerated by the addition of known catalysts. Suitable catalysts for the polyurethane-forming reaction and also for the condensation reaction between isocyanate and carboxyl groups include the compounds described in DE-AS 2,626,175, column 7, line 35 to column 8, line 27 (U.S. Pat. No. 4,100,144, column 6, line 63 to column 7, line 19) Reaction products of amines with carbonyl compounds, particularly aldimines based on aliphatic aldehydes such as butyraldehyde and aromatic amines such as aniline, are also particularly suitable.

Organometallic compounds, especially organic titanium zinc,or tin compounds such as tetraisopropyl titanate, zinc octoate, dibutyl tin oxide or dibutyl tin dilaurate, are particularly suitable for accelerating the addition reactions taking place between carboxyl and hydroxyl groups on the one hand and carbodiimide groups on the other hand.

The catalysts are used, if at all, in a quantity of about 0.01 to 5.0% by weight, preferably about 0.1 to 3.0% by weight, based on the products according to the invention and not including the compounds containing isocyanate-reactive groups.

The mixtures obtained from the above-mentioned components essential to the invention and auxiliaries and additives by mixing at room temperature are stable in storage at room temperature or moderately elevated temperature (up to about 50° C.) and react to form crosslinked plastics by heating to temperatures above about 80° C., preferably to temperatures of about 180° to 700° C. and more preferably to temperatures of about 200° to 500° C. with simultaneous evaporation of the volatile constituents present (for example solvents), if any.

The application according to the invention is particularly suitable for the production of lacquer coatings on heat-resistant substrates and preferably for the production of wire lacquer coatings. The mixtures of the components essential to the invention and the auxiliaries and additives used, if any, may be applied to suitable substrates by any known coating techniques, followed by hardening of the coating at a temperature within the ranges mentioned above. Suitable substrates include metals, ceramics, glass fibers or glass cloths. Particularly preferred substrates are metal wires.

Where liquid or low-melting binder components are used, the coating compositions may be processed from the melt.

In the lacquering of wires, the wires are lacquered by the known dip-coating, roll-coating or absorbent-felt methods, followed by drying, i.e. hardening of the lacquer coatings, in drying ovens at a temperature within the above-mentioned ranges. By virtue of the use of the products obtained by the process according to the invention as crosslinking agents for the wire lacquers, it is possible to obtain particularly high lacquering speeds, i.e. particularly short drying times.

Because of the excellent electrical and mechanical properties of the sheet-form materials obtained, the process according to the invention is also suitable for the production of insulation fabrics and also for the impregnation of electric motors.

In the following examples, all the percentages represent percentages by weight. The contents of blocked NCO-groups were expressed as "NCO", i.e. on the basis of a molecular weight of 42.

EXAMPLES

EXAMPLE 1 a) Production 2160 g cresol were added dropwise over a period of 2 h at 80° C. to 5000 g of 4,4'-diisocyanatodiphenylmethane and reacted at 120° C. After about 4 h, an NCO content of 11.8% was obtained ($NCO_{theor.} = 11.7\%$). The product was diluted by the addition of 3070 g glycol monomethylether acetate to form a 70% solution having an NCO-content of 8.3% ($NCO_{theor.} = 8.2\%$).

The carbodiimidization reaction was catalyzed by the addition at 60° C. of 20 g (0.2%) methylphospholine oxide (a mixture of 1-methyl-1-phospha-2-cyclopentene-1-oxide and 1-methyl-1-phospha-3-cyclopentene-1-oxide) and was followed by measuring the evolution of $CO_2$. After about 12 h, the evolution of gas stopped at 220 l $CO_2$ (>90% of the maximum theoretical quantity). The calculated conversions, based on the evolution of $CO_2$, and the reduction in the NCO-content ran parallel to one another.

A solution of a blocked isocyanate having the following characteristics was obtained:

| | |
|---|---|
| Concentration | approx. 70% |
| Viscosity | $\eta$ (23° C.) = 6000 mPas |
| Free NCO-content | <0.1% |
| Blocked NCO-content | 8.5% (analysis method: 30 mins./180° C. using di-n-butylamine in o-dichlorobenzene) |
| Blocked NCO-content (calculated) | 8.5% |
| IR | 2110, 2140 cm$^{-1}$ (carbodiimide) |
| Carbodiiide content (NCN) (calculated from quantity of $CO_2$) | 3.1% |
| Uretone iine content ($C_2N_3O$) (calculated from quantity of $CO_2$) | 1.3% | b) Application 100 parts by weight of a hydroxy urethane (OH number 190) prepared from 26.5% 1,6-hexane diol, 21.0% trimethylol propane, 1.8% ε-caprolactam and 50.7% diisocyanatotoluene (2,4- and 2,6-isomers in a ratio by weight of 8:2) were dissolved under reflux at temperatures of up to 130° C. in a mixture of 310 parts by weight cresol and 305 parts by weight xylene. The cooled solution was mixed with 285 parts by weight of 70% solution of the blocked isocyanate prepared as described above, after which 1%, based on the solids content of the lacquer, of the aldimine based on butyraldehyde and aniline was added to the lacquer mixture.

In a vertical wire lacquering machine in analogy to the machine described in U.S. Pat. No. 3,397,253, column 7, lines 38-65 comprising a 4 m-long oven, a 0.7 mm diameter copper wire was lacquered in six passes by means of felt strippers to an increase in diameter of 50 μm. At an oven temperature of 350° C., the wire was lacquered at a speed of up to 20 meters per minute without the lacquer film developing cracks when the copper wire was subsequently stretched to the breaking point (approx. 40% elongation).

When a conventional, commercial lacquer system which differed from the lacquer system according to the invention solely in the type of hardener used (an equivalent quantity of a blocked polyisocyanate based on the reaction product of 55.6% diisocyanatotoluene (2,4- and 2,6-isomer in a ratio by weight of 8:2), 14.3% trimethylol propane and 30.1% phenol), the wire lacquering process could only be carried out at a speed of up to 12 m/minute.

Both lacquer coatings were tinned in 3 to 4 seconds at a tinning temperature of 370° C.

EXAMPLE 2 a) Production 2700 g cresol were added over a period of 1 hour at 60° C. to 4350 g of a mixture of 2,4-diisocyanatotoluene and 2,6-diisocyanatotoluene (ratio by weight=8:2), after which the mixture was left to react for about 5 h at 80° to 100° C. When the NCO-content had reached 14.9% ($NCO_{theor.} = 14.9\%$), the reaction mixture was diluted with 3020 g glycol monomethylether acetate. The 70% solution which had an NCO content of 10.4% ($NCO_{theor.} = 10.4\%$) was catalyzed by the addition at 60° C. of 25 g methylphospholine oxide (a mixture of 1-methyl-1phospha-2-cyclopentene-l-oxide and 1-methyl-1-phospha-3-cyclopentene-1-oxide). The carbodiimidization reaction was followed by measuring the evolution of $CO_2$ and was complete after about 20 h (280 l $CO_2$).

The solution of the blocked isocyanate had the following characteristics:

| Concentration | approx. 70% |
|---|---|
| Viscosity | $f$ (23° C.) = 1500 mPas |
| Free NCO-content | 0.1% |
| Blocked NCO-content (calculated) | 11.0% |
| IR | 2140 cm$^{-1}$ (carbodiimide) |
| Carbodiimide content (calculated from quantity of $CO_2$) | 4.2% |
| Uretone imine content (calculated from quantity of $CO_2$) | 1.4% | b) Application 150 parts by weight of the hydroxy urethane of Example 1 were dissolved while stirring at up to 130° C. in a solvent mixture of 304 parts by weight cresol and 300 parts by weight xylene. 245 parts by weight of the 70% solution prepared as described above were added to the cooled solution. 1.5% of the aldimine of Example 1 was then added, based on the solids content.

In the wire lacquering test carried out as in Example 1, lacquering could be carried out at a speed of up to 22 m/minute before the lacquer film develops cracks by stretching of the copper wire.

EXAMPLE 3 a) Production 2160 g cresol were added over a period of 1 h at 80° C. to a mixture of 2500 g 4,4'-diisocyanatodiphenylmethane and 1740 g 2.4-diisocyanatotoluene and 2,6-diisocyantotoluene (ratio by weight=8:2), after which the mixture was reacted for about 4 h at 100° to 120° C. When the NCO-content reached 13.2% (NCO-$_{theor.}$=13.1%), the reaction mixture was diluted with 2740 g glycol monomethylether acetate.

The carbodiimidization reaction was catalyzed by the addition at 60° C. of 20 g methylphospholine oxide (a mixture of 1-methyl-1-phospha-2-cyclopentene-1-oxide and 1-methyl-1-phospha-3-cyclopentene-1-oxide). After about 15 h, the evolution of $CO_2$ stopped at 210 l (approx. 90%).

A solution of a blocked isocyanate having the following characteristics was obtained:

| Concentration | approx. 70% |
|---|---|
| Viscosity | $\eta$ (23° C.) = 4600 mPas |
| Free NCO-content | <0.1% |
| Blocked NCO-content (calculated) | 9.6% |
| IR | 2140 cm$^{-1}$ (carbodiimide) |
| Carbodiimide content quantity of $CO_2$ | 2.9% |
| Uretone imine content (calculated from quantity of $CO_2$) | 2.2% | b) Application 643 parts by weight of the 70% solution of the blocked isocyanate prepared as described above were diluted with 571 parts by weight cresol and 286 parts by weight xylene (cresol:xylene=2:1) to form a solution having a solids content of 30%.

To 1500 parts of this solution by weight were added 1000 parts by weight of a 30% solution in cresol:xylene (2:1) of a polyester prepared from 63.5% terephthalic acid, 14.1% glycerol, 21.3% ethylene glycol and 1.1% adipic acid and having an OH content of 5% and a carboxyl content of 0.4%. 1%, based on the solids content, of a zinc octoate solution having a zinc content of 8% was then added. A 0.7 mm diameter wire was lacquered with this solution as described in Example 1 to an increase in thickness of approximately 50μm. Lacquering speeds of up to 20 m/minute were possible. The wire obtained was coiled around its own diameter and then exposed for 30 minutes to a temperature of 180° C. without the lacquer film developing cracks. In this case, however, the lacquered wires could not be tinned at 370° C.

EXAMPLE 4 a) Production 2500 g 4,4'-diisocyanatodiphenylmethane were blocked with 864 g cresol over a period of about 10 h to an NCO-content of 15.2% (NCO$_{theor.}$=15.0%). 1440 g glycol monomethylether acetate were added (70% solution, NCO=10.3%), after which the reaction was catalyzed by the addition at 40° C. of 12 g methylphospholine oxide (a mixture of 1-methyl-1-phospha-2-cyclopentene-1-oxide and 1-methyl-1-phospha-3-cyclopentene-1-oxide). A degree of carbodiimidization of approximately 75% was reached after 1 h at 60° C. (NCO content=3.0%, 11% 110 l $CO_2$-maximum theoretical quantity $CO_2$=144 l), the reaction was then stopped by the addition of 36 g perfluorobutane sulfonic acid dissolved in dimethylformamide in a ratio of 1:3.

The solution was then stirred for 12 h at 60° C. until it was free from isocyanate groups. A product having the following characteristics is obtained:

| Concentration | approx. 70% |
|---|---|
| Viscosity | $\eta$ (23° C.) = 8500 mPas |
| Free NCO-content | <0.1% |
| Blocked NCO-content | 6.9% (analysis method: 30 mins./180° C. using di-n-butylamine in o-dichlorobenzene) |
| Blocked NCO-content (calculated) | 7.3% |
| IR | 2100 cm$^{-1}$ (carbodiimide) |
| Carbodiimide content (calculated from quantity of $CO_2$) | 1.6% |
| Uretone imine content (calculated from quantity of $CO_2$) | 5.0% | b) Application 1000 parts by weight of the hydroxyurethane corresponding to Example 1 (OH content 6%) were dissolved in 4238 parts by weight cresol while heating to at most 130° C. and, after cooling, the resulting solution was combined with 1429 parts by weight of the product prepared as described in a). 1.5%, based on the solids content, of the aldimine of Example 1 was then added.

A 0.7 mm diameter copper wire was lacquered with this solution to an increase in diameter of 50 μm in a wire lacquering machine with catalytic combustion of the solvents and strippers of the jet type (enameling equipment VE 5 of Maschinen- und Apparatebau, Graz, Austria).

| Lacquering conditions: | |
|---|---|
| Oven length | 5 m |
| Average oven temperature | 500° C. |
| Number of passes | 8 |

The lacquering speed was increased to 115 m/min. without the lacquering film developing cracks on stretching of the copper wire to breaking point.

The lacquered wire taken off at a rate of 100 m/minute can be tinned in 3 seconds at a soldering bath temperature of 370° C. When the same hydroxyurethane was combined with an equivalent quantity of the commercial blocked polyisocyanate described in Example 1, lacquering could only be carried out at a speed of up to 80 m/min. under the same stoving conditions.

EXAMPLE 5

325 parts by weight of a polyester based on 66.2% adipic acid, 29.5% ethylene glycol and 4.3% trimethylol propane and having an OH-group content of approx. 1.8% were dissolved under reflux at a temperature of up to 130° C. in a solvent mixture of 70 parts by weight cyclohexanone, 143 parts by weight methylethylketone and 200 parts by weight xylene. After cooling, 272 parts by weight of the solution prepared in Example 1 a) of the blocked isocyanate containing carbodiimide structures were added. Before processing of the lacquer, 2.5 parts by weight of a commercial polyether polysiloxane as levelling aid (Baysilon OL 17, a lacquer additive made by Bayer AG, Leverkusen) and 2.5 parts by weight zinc octoate containing 8% zinc were added.

Glass filament hoses were impregnated with the solution thus prepared. This required 6 immersions. After each immersion the excess lacquer was drained and the coated hoses were aired for 10 minutes to remove most of the solvent. Finally, coatings 1 to 5 were stoved for 10 minutes at 140° C. and coating 6 for 60 minutes at 140° C. Very flexible insulation hoses were obtained. The average breakdown voltage, as measured in accordance with DIN 40 620, was 7 KV.

The weight loss at 17° C. was 13.8% after 4 weeks.

EXAMPLE 6 a) Production 2160 g cresol were added dropwise over a period of 1 h at 60° C. to 5000 g 4,4'-diisocyanatodiphenylmethane, after which the mixture was left to react for 3 h at 140° C. to an NCO-content of 10.8% ($NCO_{theor.} = 11.7\%$). The reaction mixture was then diluted by addition of 5000 g glycol monomethylether acetate to form a 59% solution having an NCO-content of 5.7% ($NCO_{theor.} = 6.9\%$).

The reaction was catalyzed by the addition at 40° C. of 20 g (0.16%) methylphospholine oxide (a mixture of 1-methyl-1-phospha-2-cyclopentene-1-oxide and 1-methyl-1-phospha-3-cyclopentene-1-oxide), after which the reaction mixture was left to react for 6 h at 60° C. to a free NCO-content of less than 0.1% at which time 180 l of $CO_2$ had been eliminated.

A solution of blocked isocyanate having the following characteristics was obtained:

| | |
|---|---|
| Concentration | approx. 59% |
| Viscosity | $\eta$ (23° C.) = 650 mPas |
| Blocked NCO-content (calculated) | 7.1% |
| IR | 2110, 2140 cm$^{-1}$ (carbodiimide) |
| Carbodiimide content (calculated from quantity of $CO_2$) | 2.0% |
| Uretone imine content (calculated from quantity of $CO_2$) | 1.0% | b) Application 150 parts by weight tris-(2-hydroxyethyl)isocyanurate were dissolved in 426 parts by weight N-methylpyrrolidone at approx. 55° C. and, after cooling, the resulting solution was combined with 424 parts by weight of the 59% solution of the blocked isocyanate prepared as described above. 1%, based on the solids content, of the aldimine according to Example 1 was then added.

The lacquer solution thus obtained was applied by dip-coating to a deep-drawn metal plate. After airing at room temperature to remove most of the solvent, the lacquer coating was stoved for 1 h at 200° C. The lacquer film obtained was elastic and combined high surface hardness with high solvent resistance to warm ethanol.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of an organic compound containing (i) carbodiimide and/or uretone imine groups and (ii) reversibly blocked isocyanate groups which comprises blocking about 10 to 90% of the isocyanate groups of an organic polyisocyanate having a molecular weight of about 174 to 1000 and containing only aromatically-bound isocyanate groups with a monofunctional blocking agent for isocyanate groups and subsequently carbodiimidizing about 65 to 100% of the remaining free isocyanate groups with the elimination of carbon dioxide.

* * * * *